United States Patent
Negrin

[11] Patent Number: 5,358,319
[45] Date of Patent: Oct. 25, 1994

[54] METHOD AND SYSTEM FOR LOW-TO-SPLIT MU DETECTION AND CONTROL FOR ANTI-LOCK BRAKE SYSTEMS

[75] Inventor: Dan Negrin, Westmount, Canada

[73] Assignee: Kelsey-Hayes Company, Romulus, Mich.

[21] Appl. No.: 100,128

[22] Filed: Jul. 30, 1993

[51] Int. Cl.⁵ .................................................. B60T 8/84
[52] U.S. Cl. .................................... 303/103; 303/111; 364/426.01
[58] Field of Search .................... 303/96, 103-111; 180/197; 366/426.01-426.03

[56] References Cited

U.S. PATENT DOCUMENTS

| | | | |
|---|---|---|---|
| 4,005,910 | 2/1977 | Leiber et al. | 303/96 |
| 4,313,166 | 1/1982 | Rode et al. | 303/111 X |
| 4,349,876 | 9/1982 | Lindermann | 303/111 X |
| 4,859,002 | 8/1989 | Yoshino | 303/103 |
| 5,123,715 | 6/1992 | Okubo | 303/103 X |
| 5,224,766 | 7/1993 | Oikawa et al. | 303/105 X |

Primary Examiner—Robert J. Oberleitner
Assistant Examiner—Alfred Muratori
Attorney, Agent, or Firm—Brooks & Kushman

[57] ABSTRACT

A method and system for modifying anti-lock brake control to a vehicle braking on a surface having a low-mu to split-mu transition. The time duration of the apply stage of an anti-lock brake system cycle is measured for the two front wheels. The measured apply stage durations are compared to a threshold. The braking coefficients of the two front wheels are qualified based on these comparisons. Each wheel is qualified as normal-duration if the apply stage duration is less than the threshold, and long-duration if the apply stage duration is greater than the threshold. Normal low-mu pressure control is continued if both front wheels are qualified as normal-duration. Split-mu pressure control is activated when exactly one of the front wheels is qualified as long-duration. The split-mu pressure control restricts the rate of brake pressure applied to the long-duration wheel. Low-mu to high-mu pressure control is utilized when both wheels are qualified as long-duration.

21 Claims, 4 Drawing Sheets

METHOD AND SYSTEM FOR LOW-TO-SPLIT MU DETECTION AND CONTROL FOR ANTI-LOCK BRAKE SYSTEMS

CROSS REFERENCE TO RELATED APPLICATION

This application is related to copending application Serial No. 08/100,551, filed Jul. 30, 1993, commonly assigned with the present invention.

TECHNICAL FIELD

This invention relates to anti-lock brake systems, and more particularly, to the control employed by anti-lock brake systems for braking on surfaces with varying coefficients of friction.

BACKGROUND ART

When the brakes are applied on a vehicle traveling at a given velocity, braking torques are generated at each of the braked wheels. The braking torque causes a retarding or braking force to be generated at the interface between the tire and the surface. The braking forces generated at the wheels then cause a decrease in the vehicle velocity.

Ideally, the braking forces at the wheels increase proportionately as the driver increases the force on the brake pedal. Unfortunately, this is not always the case in braking procedures. As the braking torque and hence the braking force at the wheel is increased, the rotational speed of the braked wheels becomes less than the speed of the vehicle. When the rotational speed of a wheel is less than the vehicle speed, "slippage" is said to occur between the tire and the surface. With further increase in brake pressure, the slippage between the tire and the surface increases until lock-up and skidding of the wheel occurs. In most cases, lock-up causes a reduction in braking force and an increase in stopping distance. Lock-up also causes a degradation in directional control due to a reduction in the lateral forces at the wheels.

Both of these problems associated with lock-up were addressed with the advent of anti-lock brake systems (ABS). A basic anti-lock brake system monitors the velocity at the each of the wheels, decides whether the wheel is excessively slipping based on these velocity measurements, and modulates the braking pressure accordingly to avoid lock-up. The ABS aids in retaining vehicle stability and steerability while providing shorter stopping distances.

One method by which a state of excessive slippage is identified in the ABS is comparing the velocity of each wheel to a reference speed. The reference speed is an estimate of the true vehicle speed based on current and previous values of the individual wheel velocities. If the velocity of a wheel is significantly less than the reference speed, then the wheel is deemed by the ABS to be excessively slipping. The ABS then reduces the pressure actuating the brake in order to reduce brake torque. The reduction of brake torque allows the friction force at the surface to accelerate the wheel, thereby causing a reduction of the slip in the wheel.

After a period of constant braking pressure following the pressure reduction, the pressure actuating the brake is increased until excessive wheel slip occurs again. The cycle of decreasing the brake pressure, maintaining constant brake pressure, and then increasing brake pressure is repeated until the anti-lock event ends. The parameters which define the specifics of this cycle depend on both the vehicle and the surface conditions.

For the present invention, the braking of a vehicle on a surface with varying coefficient of friction is considered. The coefficient of friction, mu, of a surface is defined as the ratio of the braking force generated at the interface between the tire and the surface, to the normal force between the tire and the surface.

Three classes of surfaces can be defined qualitatively in terms of mu: high-mu, low-mu, and split-mu. A high-mu surface is one which produces relatively good braking ability. Dry asphalt is an example of a high-mu surface. A low-mu surface is characterized by its resulting in poor braking ability. An example of a low-mu surface is a road covered with snow or ice. A split-mu surface is encountered when a vehicle has some of its tires on a low-mu surface and the other tires on a high-mu surface. An example of a split-mu surface is a road with snow or ice on one side of the vehicle and dry asphalt on the other side of the vehicle.

An example of braking on a low-mu to split-mu transition can be envisaged based on the previous examples. Consider a vehicle braking on a snow-covered surface. Suppose that during the braking procedure, the left tires become exposed to a cleared section of the road (e.g., asphalt) while the right tires are still exposed to snow. In this situation, the vehicle would be pulled to the high-mu side (here, the left side) of the road because of the increased braking force on the newly high-mu wheel. The driver would then have to provide corrective steering measures to maintain the intended direction of the vehicle.

The need exists within an anti-lock brake system for reducing the pull to the newly high-mu side of a vehicle braking on a low-mu to split-mu transition.

SUMMARY OF THE INVENTION

It is thus an object of the present invention to provide a method and system for reducing the pull to the newly high-mu side of a vehicle braking on a low-mu to split-mu transition during an anti-lock brake system event.

A further object of the present invention is to provide a method and system for detecting a transition from a low-mu surface to a split-mu surface during an anti-lock brake system event.

In carrying out the above objects, the present invention provides a method and system for modifying an anti-lock brake control to a vehicle braking on a transition from a low-mu surface to a split-mu surface during an anti-lock brake system event. A time duration defined in terms of an anti-lock brake system cycle is measured for each wheel aligned on a latitudinal axis of the vehicle. Each time duration is compared to a selected threshold. Each wheel is qualified, either as normal-duration if the corresponding time duration is less than the selected threshold or as long-duration if the corresponding time duration is greater than the selected threshold. The transition from the low-mu surface to the split-mu surface is detected when at least one wheel is qualified as normal-duration and at least one wheel is qualified as long-duration. The anti-lock brake control is modified when the low-mu to split-mu transition is detected.

In carrying out the above objects, the present invention further provides a method and system for detecting a transition from a low-mu surface to a split-mu surface during an anti-lock brake system event for a vehicle. A time duration defined in terms of an anti-lock brake system cycle is measured for each wheel aligned on a latitudinal axis of the vehicle. Each time duration is compared to a selected threshold. Each wheel is qualified, either as normal-duration if the corresponding time duration is less than the selected threshold or as long-duration if the corresponding time duration is greater than the selected threshold. The transition from the low-mu surface to the split-mu driving surface is detected when at least one wheel is qualified as normal-duration and at least one wheel is qualified as long-duration.

DETAILED DESCRIPTION OF THE INVENTION

Figure 1:
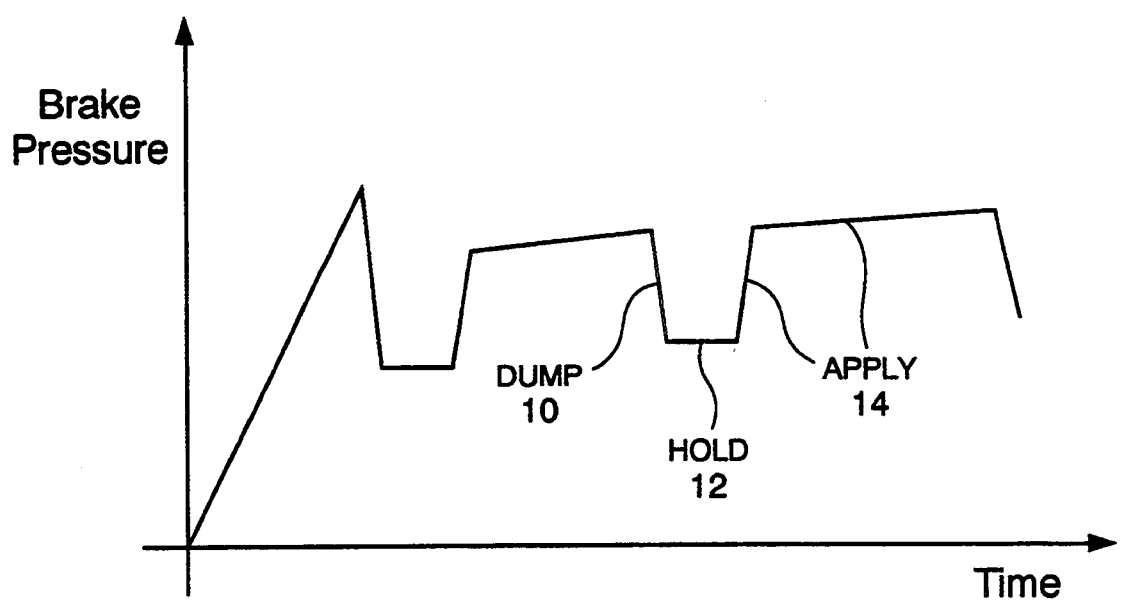
FIG. 1 shows an example of brake pressure cycling during an anti-lock brake system event.

FIG. 1 shows an example of brake pressure cycling that occurs during an ABS event. A cycle consists of: a dump stage 10 where the brake pressure is decreasing with time, a hold stage 12 where the brake pressure is nearly constant, and an apply stage 14 where the brake pressure is increasing with time. The cycle is formed as follows. When excessive slip occurs in a wheel, which is subsequently referred to as wheel departure, the ABS initiates the dump stage 10. Pressure is reduced in the brake, thus reducing the slip in the wheel. The brake pressure is then held constant in the hold stage 12, allowing the wheel to accelerate and approach the velocity of the vehicle. The apply stage 14 then increases the brake pressure in order to continue retarding the motion of the vehicle. If the apply stage 14 causes excessive slip in the wheel, then the cycle repeats.

An indication of a change in the braking coefficient mu can be obtained by measuring the amount of time spent in the apply stage 14. A transition to a higher-mu surface produces a greater apply stage duration. This occurs because of the relative ease of producing wheel departure (excessive slip) on lower-mu surfaces, and because wheel departure initiates the dump stage 10.

The method of the present invention employs an apply time threshold such that an apply time above the threshold is considered to be produced by a relatively higher-mu surface. Similarly, an apply time below the threshold is considered to be produced by a relatively lower-mu surface.

Figure 2:
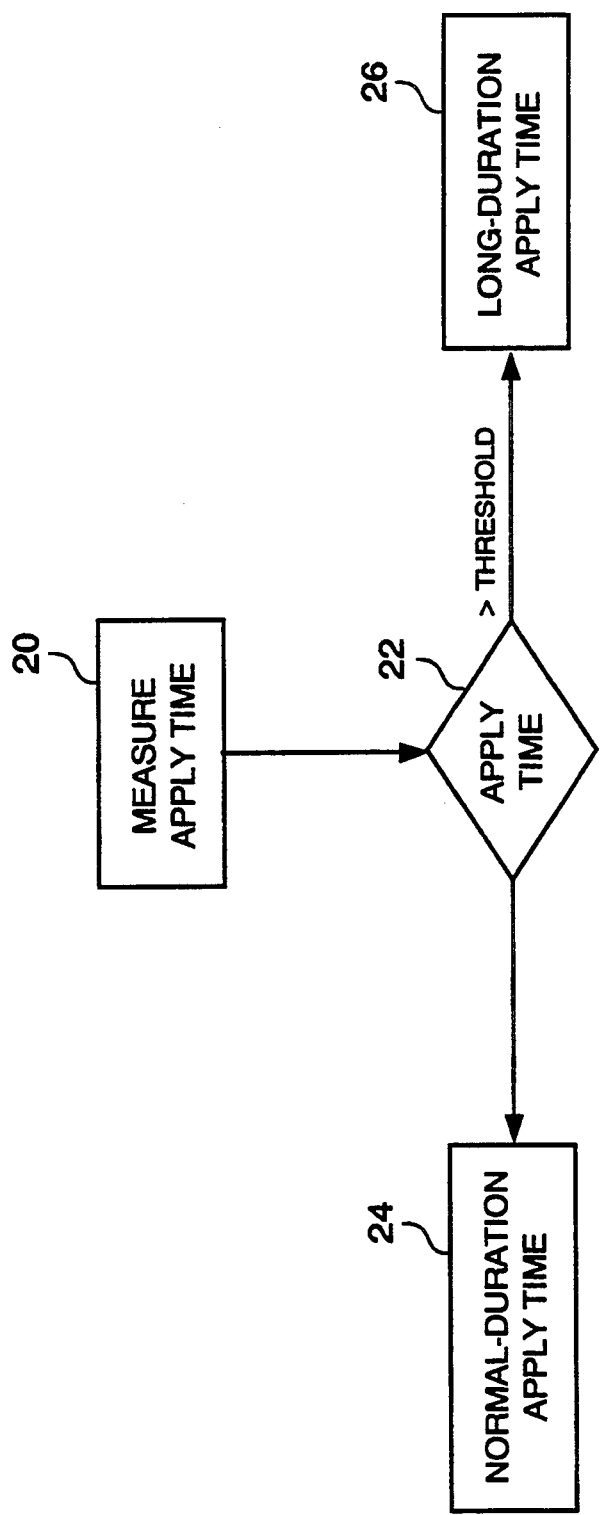
FIG. 2 shows a flow chart representation of one embodiment of the method of qualifying a relative coefficient of friction of the surface under a wheel in the present invention.

FIG. 2 shows a block diagram of the method for qualifying the apply time for each wheel, thus providing an indication of the relative coefficient of friction of the surface under each wheel. The apply time, specifically the amount of time spent in the apply stage in the previous cycle, is measured in block 20. Block 22 compares the measured apply time with the apply time threshold. If the apply time is less than the threshold, an indication of a normal-duration apply time is given in block 24. If the apply time is greater than the threshold, then an indication of a long-duration apply time is given in block 26.

Given the definitions of apply time and the apply time threshold, and the method for qualifying the relative braking coefficient of the surface under a wheel, the low-to-split mu method can be summarized as follows: any low-mu to high-mu pressure apply mode is overridden until the apply times of both front wheels have exceeded the apply time threshold. More specifically, normal low-mu pressure control is used for wheels whose apply time has not exceeded the threshold. Apply rate restriction is used if the apply time of one wheel has exceeded the threshold, but the apply time of the other wheel has not exceeded the threshold. Finally, if both of the front wheels have exceeded the apply time threshold, a low-mu to high-mu control is used.

While apply time is used in the preferred embodiment as an indicator of mu transition, one with ordinary skill in the art will recognize that other time durations derived from an anti-lock brake system cycle could similarly be used.

Figure 3:
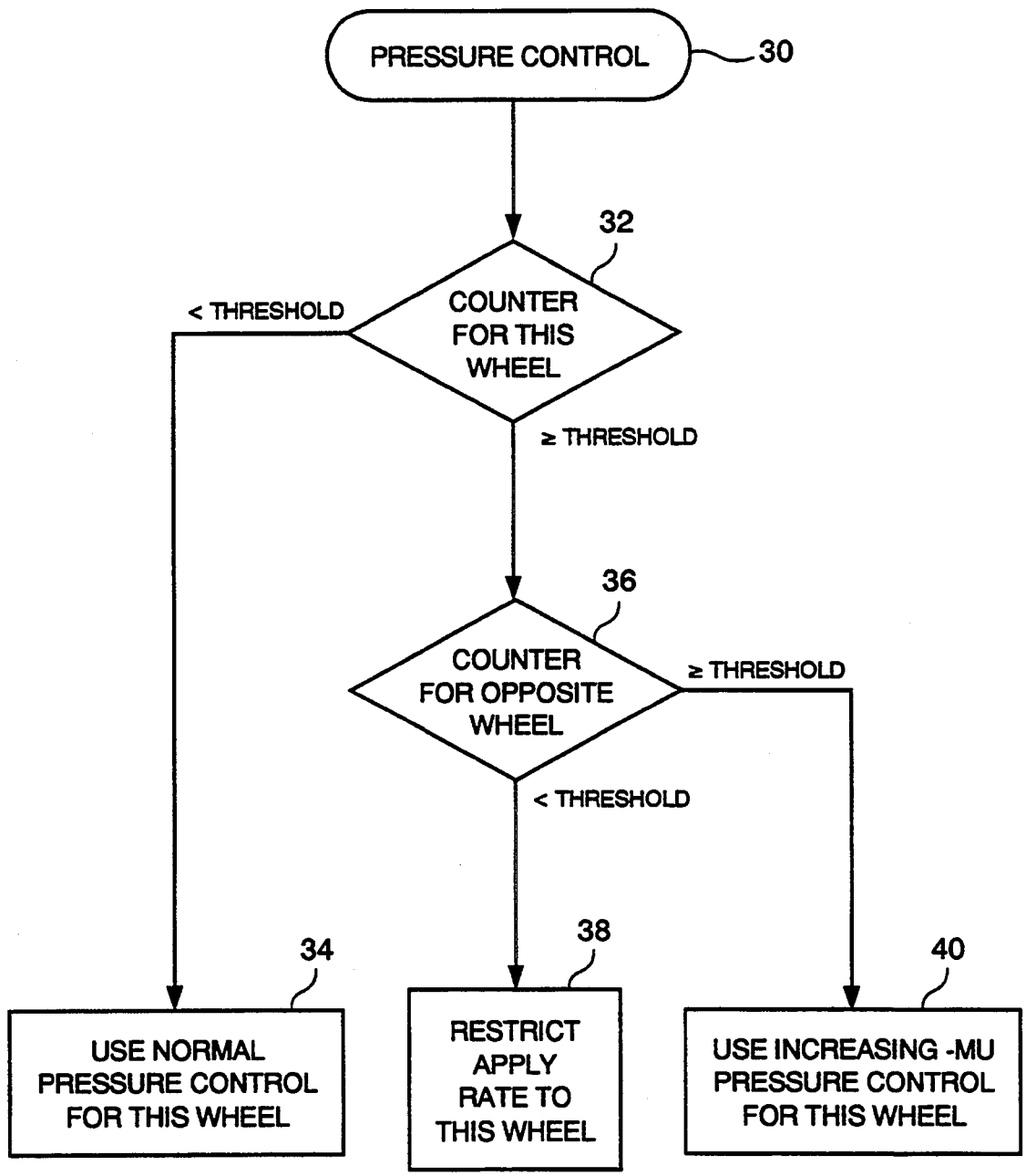
FIG. 3 is a flow chart representation of one embodiment of the low-to-split mu control method of the present invention.

FIG. 3 shows a flow chart representation of an embodiment of the low-to-split mu control method subroutine for the front two wheels of the vehicle. Within an ABS iteration, this subroutine is called twice—once for each of the two front wheels. First, the subroutine is entered at block 30. The amount of time that the current wheel (specifically, the wheel for which the subroutine is called) has been in the apply mode during its current ABS cycle is examined in conditional block 32. The apply mode time is measured by an apply time counter, with the value of the apply time counter (for each wheel) supplied by the main ABS routine.

If the apply time counter is less than a selected counter threshold, then normal pressure control in block 34 is applied to the current wheel. If the apply time counter is greater than the counter threshold, then the value of the apply time counter for the opposite front wheel is examined in conditional block 36. An alternative pressure control, such as the apply rate restriction in block 38, is employed for the current wheel if the apply time counter for the opposite wheel is less than the counter threshold. If the apply time counter for the opposite wheel is greater than the counter threshold, the increasing-mu pressure control in block 40 is used.

Figure 4:
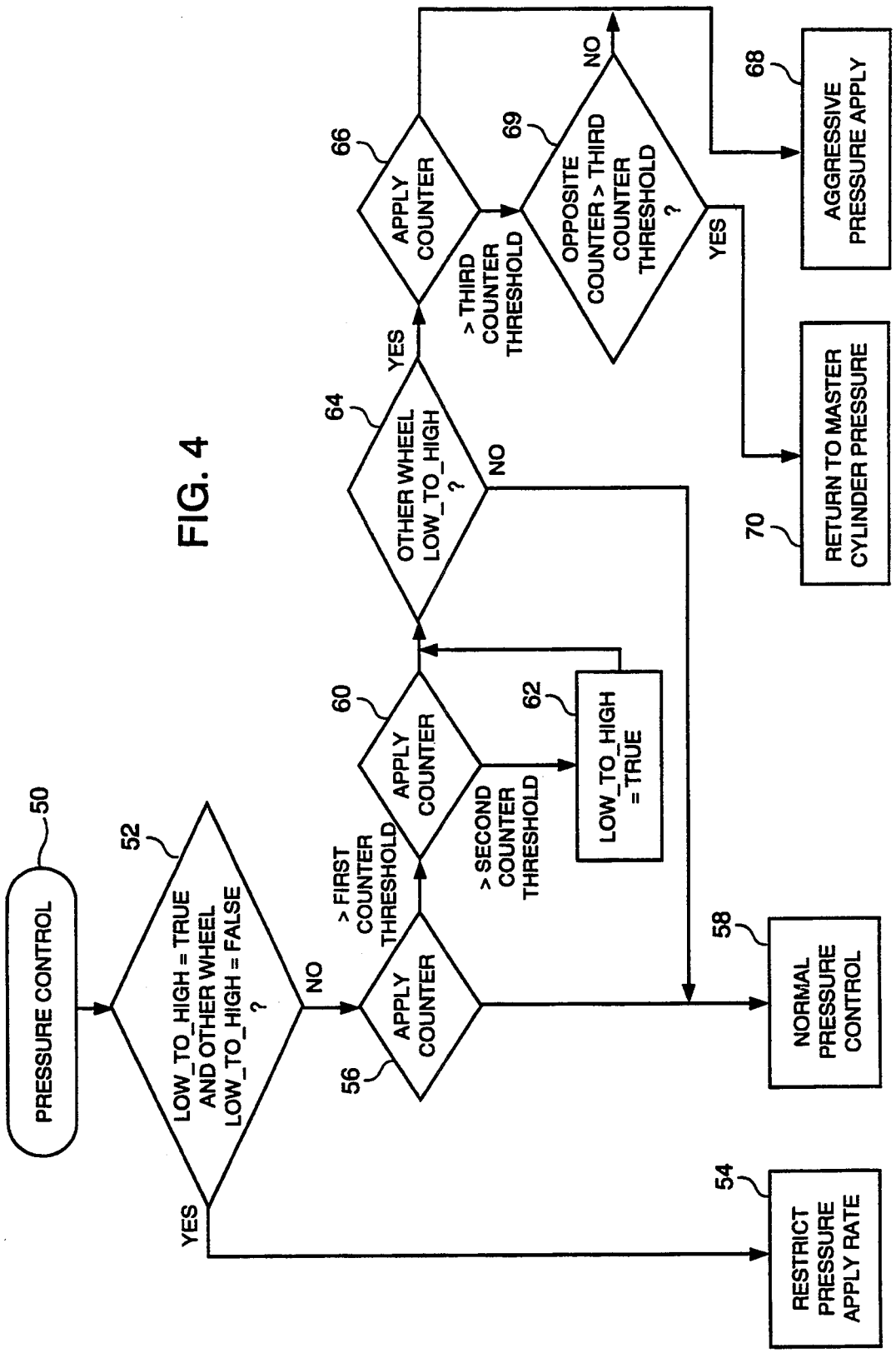
FIG. 4 is a flow chart representation of a more specific embodiment of the present invention for low-mu to split-mu ABS control of the front two wheels of the vehicle.

FIG. 4 shows a more specific subroutine embodiment of low-to-split mu ABS control of the front two wheels of the vehicle. Once again, this subroutine is executed alternately for each of the two front wheels and values of the apply time counters (one for each wheel) are supplied by the main ABS routine.

After entering the subroutine in block 50, the condition of being on the higher-mu side of split-mu is examined in block 52. If a low-to-high flag for the current wheel is set to "true" and a low-to-high flag for the other wheel is set to "false" (i.e., the current wheel has detected a lower-mu to higher-mu transition and the other wheel has not detected a lower-mu to higher-mu transition), then an alternative pressure control, such as restricting the apply rate to the current wheel in block 54, is used for the current wheel. This alternate pressure control restricts an increase in apply rate which could be effectuated in a standard lower-mu to higher-mu transition.

If the current wheel is not on the higher-mu side of a split mu (which can occur if the current wheel has not detected the lower-mu to higher-mu transition or if the other wheel has detected the lower-mu to higher-mu transition), then the apply counter is examined in conditional block 56. If the apply counter is less than a first counter threshold, then normal pressure control as shown in block 58, such as the cyclic pressure control of FIG. 1, is continued to the current wheel. If the apply counter is greater than the first counter threshold, then the apply counter is examined again in conditional block 60.

If the apply counter in block 60 is greater than a second counter threshold, then the current wheel is considered to have made the transition from the lower-mu to the higher-mu surface. Block 62 sets the low-to-high flag for the current wheel indicating this transition. It should be emphasized that there are two low-to-high flags—one for each of the two front wheels. After setting the low-to-high flag, conditional block 64 is executed next. If the apply counter in block 60 is less than the second counter threshold, then conditional block 64 is executed without setting the low-to-high flag in block 62.

Conditional block 64 examines the status of the low-to-high flag of the other front wheel. If the low-to-high flag for other wheel is false, then normal pressure control, such as the low-mu apply rate in block 58, is utilized. If the low-to-high flag for the other wheel is true, then conditional block 66 is executed.

Conditional block 66 compares the apply counter to a third counter threshold. If the apply counter is less than the third counter threshold, then an aggressive apply rate is utilized in the wheel by block 68. If the apply counter is greater than the third counter threshold for both wheels as shown in block 69, then both wheels are returned to master cylinder pressure by block 70.

A summary of the possible outcomes of this method is as follows. When both front wheels are braking on the lower-mu surface, the apply counters do not generally exceed the three thresholds. This results in the normal ABS control being employed in the apply modes for both front wheels. After one front wheel traverses onto the higher-mu surface as specified by the second counter threshold, the apply rate is restricted on the newly higher-mu wheel while the lower-mu wheel continues normal pressure control. If the lower-mu wheel traverses onto the higher-mu surface as specified by the first counter threshold (hence both wheels are on higher-mu surfaces), the aggressive apply is employed on both the newly higher-mu wheel and the previous higher-mu wheel. Finally, after a time duration without wheel departure, defined by the third counter threshold, both wheels are de-isolated and the pressure is returned to master cylinder pressure.

Although the preferred embodiment is based upon the front wheels of the vehicle, one skilled in the art would recognize that the present invention can be adapted to include the rear wheels of the vehicle in both the detection of low-mu to split-mu transition and the subsequent modification of the anti-lock control of the vehicle. More generally, the present invention can be adapted to include a plurality of wheels aligned on any latitudinal axis of the vehicle, wherein a front axle and a rear axle are examples of latitudinal axes. The detection of the transition would occur when at least one wheel on the latitudinal axis detects a low-to-high transition, i.e., when at least one wheel is qualified as long-duration.

One with ordinary skill in the art will recognize that the apply time counters of the present invention could count down rather than count up as described herein. In this case, the comparisons to the various thresholds would be inverted. For instance, a count less than the apply time threshold would indicate a long apply time duration rather than a short apply time duration.

While the best mode for carrying out the invention has been described in detail, those familiar with the art to which this invention relates will recognize various alternative designs and embodiments for practicing the invention as defined by the following claims.

What is claimed is:

1. A method of detecting a transition onto a split-mu surface from a lower-mu surface during an anti-lock brake system event of a vehicle, the vehicle comprising two wheels aligned on a latitudinal axis of the vehicle and an anti-lock brake system capable of cyclic control of brake pressure with at least one pressure apply stage per anti-lock brake system cycle, the method comprising the steps of:
    (a) measuring a time duration, defined in terms of the anti-lock brake system cycle, for each wheel;
    (b) comparing each time duration to a predetermined threshold;
    (c) characterizing each of the wheels, wherein each wheel is characterized as normal-duration if the corresponding time duration is less than the predetermined threshold, and each wheel is characterized as long-duration if the corresponding time duration is greater than the predetermined threshold; and
    (d) determining that the transition from the lower-mu surface to the split-mu surface as occurred if one wheel is characterized as normal-duration and the other wheel is characterized as long-duration.

2. The method of claim 1 wherein the two wheels are front wheels of the vehicle.

3. The method of claim 1 wherein steps (a), (b), (c), and (d) are repeated as long as the two wheels are both characterized as normal-duration.

4. The method of claim 1 wherein the time duration is the time duration of the pressure apply stage of the anti-lock brake system cycle.

5. A system for detecting a transition onto a split-mu surface from a lower-mu surface during an anti-lock brake system event of a vehicle, the vehicle comprising two wheels aligned on a latitudinal axis of the vehicle and an anti-lock brake system capable of cyclic control of brake pressure with at least one pressure apply stage per anti-lock brake system cycle, the system comprising:
    duration measuring means, operatively associated with the anti-lock brake system, for measuring a time duration, defined in terms of the anti-lock brake system cycle, for each wheel;
    comparison means, operatively associated with the duration measuring means, for comparing each time duration to a predetermined threshold;
    characterizing means, operatively associated with the comparison means, for characterizing each of the wheels, wherein each wheel is characterized as normal-duration if the corresponding time duration is less than the selected threshold, and each wheel is characterized as long-duration if the time duration is greater than the selected threshold; and
    detecting means, operatively associated with the characterizing means, for determining that the transition from the lower-mu surface to the split-mu surface has occurred if one wheel is characterized as normal-duration, the other wheel is characterized as long-duration, and all of the wheels had previously been characterized as normal-duration.

6. The system of claim 5 wherein the two wheels are front wheels of the vehicle.

7. The system of claim 5 wherein the time duration is the time duration of the pressure apply stage of the anti-lock brake system cycle.

8. The system of claim 5 wherein the duration measuring means comprise a digital counter.

9. A method of modifying an anti-lock brake pressure control to a vehicle braking on a transition onto a split-mu surface from a lower-mu surface during an anti-lock brake system event, the vehicle comprising two wheels aligned on a latitudinal axis of the vehicle and an anti-lock brake system capable of cyclic control of brake pressure with at least one pressure apply stage per anti-lock brake system cycle, the method comprising the steps of:
 (a) measuring a time duration, defined in terms of an anti-lock brake system cycle, for each wheel;
 (b) comparing each time duration to a predetermined threshold;
 (c) characterizing each of the wheels, wherein each wheel is characterized as normal-duration if the corresponding time duration is less than the predetermined threshold, and each wheel is characterized as long-duration if the time duration is greater than the predetermined threshold;
 (d) determining that the transition from the lower-mu surface onto the split-mu surface has occured if one wheel is characterized as normal-duration and the other wheel is characterized as long-duration; and
 (e) modifying the anti-lock brake pressure control when the lower-mu to split-mu transition is detected.

10. The method of claim 9 wherein the two wheels are front wheels of the vehicle.

11. The method of claim 9 wherein steps (a), (b), (c), (d), and (e) are repeated as long as the two wheels are both characterized as normal-duration.

12. The method of claim 9 wherein the time duration is the time duration of the pressure apply stage of the anti-lock brake system cycle.

13. The method of claim 9 wherein the step of modifying comprises the step of providing a split-mu pressure control when the lower-mu to split-mu transition is detected.

14. The method of claim 13 wherein the step of providing split-mu pressure control comprises the step of restricting a rate of brake pressure applied to the wheel characterized as long-duration.

15. A system for modifying an anti-lock brake control to a vehicle braking on a transition onto a split-mu surface from a lower-mu surface during an anti-lock brake system event, the vehicle comprising two wheels aligned on a latitudinal axis of the vehicle and an anti-lock brake system capable of cyclic control of brake pressure with at least one pressure apply stage per anti-lock brake system cycle, the system comprising:
 duration measuring means, operatively associated with the anti-lock brake system, for measuring a time duration, defined in terms of an anti-lock brake system cycle, for each wheel; comparison means, operatively associated with the duration measuring means, for comparing each time duration to a predetermined threshold;
 characterizing means, operatively associated with the decision means, for characterizing each of the wheels, wherein each wheel is characterized as normal-duration if the time duration is less than the predetermined threshold, and each wheel is characterized as long-duration if the time duration is greater than the predetermined threshold;
 detecting means, operatively associated with the characterizing means, for determining that the transition from the lower-mu surface onto the split-mu surface has occurred if one wheel is characterized as normal-duration, the other wheel is characterized as long-duration, and all of the wheels had previously been characterized as normal-duration; and
 modification means, operatively associated with the detecting means and the anti-lock brake system, for modifying the anti-lock brake control when the lower-mu to split-mu transition is detected.

16. The system of claim 15 wherein the two wheels are front wheels of the vehicle.

17. The system of claim 15 wherein the time duration is the time duration of the pressure apply stage of the anti-lock brake system cycle.

18. The system of claim 15 wherein the duration measuring means comprise a digital counter.

19. The system of claim 15 wherein the modification means comprise means for providing a split-mu pressure control when the lower-mu to split-mu transition is detected.

20. The system of claim 19 wherein the split-mu pressure control means comprise means for restricting a rate of brake pressure applied to the wheel characterized as long-duration.

21. A system for modifying an anti-lock brake control to a vehicle braking on a transition onto a split-mu surface from a lower-mu surface during an anti-lock brake system event, the vehicle comprising two front wheels and an anti-lock brake system capable of cyclic control of brake pressure with at least one pressure apply stage per anti-lock brake system cycle, the system comprising:
 a plurality of digital counters, operatively associated with the anti-lock brake system, for measuring a duration of the pressure apply stage of an anti-lock brake system cycle corresponding to each front wheel;
 comparison means, operatively associated with the digital counters, for comparing each digital counter to a predetermined threshold;
 characterizing means, operatively associated with the comparison means, for characterizing each of the front wheels, wherein each front wheel is characterized as normal-duration if the corresponding digital counter is less than the predetermined threshold, and each front wheel is characterized as long-duration if the corresponding digital counter is greater than the predetermined threshold;
 detecting means, operatively associated with the characterizing means, for determining that the transition from the lower-mu surface onto the split-mu surface has occurred if one front wheel is characterized as normal-duration, one front wheel is characterized as long-duration, and both of the front wheels had previously been characterized as normal-duration; and
 modification means, operatively associated with the detecting means and the anti-lock brake system, for restricting a rate of brake pressure applied to the front wheel characterized as long-duration when the lower-mu to split-mu transition is detected.

* * * * *